United States Patent
Maison et al.

(10) Patent No.: US 7,178,068 B2
(45) Date of Patent: Feb. 13, 2007

(54) MEMORY IMAGE VERIFICATION SYSTEM AND METHOD

(75) Inventors: David L. Maison, Richardson, TX (US); Jeffrey Naset, Richardson, TX (US); Charles R. Plaine, Columbus, OH (US); Chris Kiick, Plano, TX (US); Mark Hattarki, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 623 days.

(21) Appl. No.: 10/113,083

(22) Filed: Apr. 1, 2002

(65) Prior Publication Data

US 2003/0188227 A1   Oct. 2, 2003

(51) Int. Cl.
G06F 11/00 (2006.01)

(52) U.S. Cl. .......................... 714/45; 714/732

(58) Field of Classification Search ............... 714/5, 714/6, 45, 54, 732
See application file for complete search history.

(56) References Cited

U.S. PATENT DOCUMENTS

| | | | |
|---|---|---|---|
| 6,678,712 B1 * | 1/2004 | McLaren et al. | 718/100 |
| 6,738,932 B1 * | 5/2004 | Price | 714/38 |
| 2002/0166053 A1 * | 11/2002 | Wilson | 713/189 |
| 2003/0097536 A1 * | 5/2003 | Atherton et al. | 711/170 |
| 2004/0044707 A1 * | 3/2004 | Richard | 707/204 |

* cited by examiner

*Primary Examiner*—Gabriel L. Chu (57) ABSTRACT

A system and method of verifying a dumped memory image following a crash of a computer system that includes physical memory, a system kernel, and a virtual memory system. At least a portion of the system memory, e.g., a page, is locked by pre-allocating the page to the system kernel during initialization of the computer system. The pre-allocated page is then withheld from the virtual memory system so that the pre-allocated page is not classified as swappable memory. The locked page of the memory is then seeded with a signature. Upon detecting the system crash, the seeded page of the memory, including an image of the seeded signature, is dumped to the dump disk. The content and the location of the memory image are then verified by comparing the image of the seeded signature with the signature that was seeded in the locked page of the memory prior to the system crash.

26 Claims, 3 Drawing Sheets

MEMORY IMAGE VERIFICATION SYSTEM AND METHOD

CROSS-REFERENCE TO RELATED APPLICATION(S)

This application discloses subject matter related to the subject matter disclosed in commonly owned, U.S. patent application Ser. No. 09/991,318, entitled "System and Method for Testing Fatal Error Handling and Recovery Code Functionality in a Computer System", filed Nov. 16, 2001 in the names of Mark Nathan Hattarki and David Leon Maison.

BACKGROUND OF THE INVENTION

1. Technical Field of the Invention

The present invention generally relates to computer systems. More particularly, and not by way of any limitation, the present invention is directed to a system and method of verifying the accuracy of a memory image that is written from system memory to a dump disk when a fatal error causes a computer system to crash.

2. Description of Related Art

For various reasons, computer systems may experience fatal errors causing them to crash. A series of tests and trouble-shooting procedures are accordingly required to determine the cause of the crash. It is often desirable for testing and trouble-shooting purposes to analyze the data that was in the computer's physical memory (i.e. Random Access Memory, RAM) at the time that the computer system crashed. Since the RAM is volatile memory, it is erased when power is removed from the computer for reinitialization purposes. Therefore, a piece of software known as crash dump path code is written to dump the contents of the physical memory out to a storage device (dump disk) when the system crashes. For this data to be useful, the data written to the dump disk must accurately reflect the data, as well as the location of the data, that was in physical memory at the time of the crash.

In order to compare the data in physical memory with the data that is dumped to disk, it is desirable to have an image of the data in RAM before the data is dumped, and an image of the data that is dumped to disk. In existing systems, however, only the "after" image is available, and developers have to assume that the dumped data accurately reflects what was in RAM before the crash. However, the accuracy of the dumped data depends on whether or not the crash dump path code has been written correctly. If not, the dumped data may not be accurate, and this may mislead developers as to the underlying cause of the system crash. Thus, it is highly desirable during development to have a method of verifying the accuracy of the dumped data, and thereby verifying the operation of the crash dump path code.

Developers have attempted to establish a "before" image by seeding the RAM with a pattern of data (i.e., signature) that can be extracted from the dumped data for comparison and verification. However, this procedure has not been successful due, in part, to the dynamic nature of the system RAM. In many operating systems, if a portion of memory is not being actively utilized, it is swapped out of the RAM and stashed on a part of the system disk called a swap partition until it is needed. When the swapped portion is needed, it is swapped back in. This swapping procedure is particularly active when running resource-intensive programs. If a portion of the RAM is swapped out when a system crash occurs, that portion of the RAM is not included in the crash dump. Therefore, an incomplete signature may be dumped. Developers have attempted to solve this problem by requiring the signature to cycle through the RAM to prevent swapping. However, this procedure has proven to be unreliable, especially when running resource-intensive programs. It should be appreciated that a solution to the aforementioned deficiencies would be highly desirable.

SUMMARY OF THE INVENTION

Accordingly, the present invention advantageously provides a system and method of verifying a memory image written from system memory to a dump disk when a computer system experiences a fatal error causing a system crash. The exemplary method locks at least one predefined portion of the system memory to prevent the locked portion from being swapped out to the swap partition prior to the system crash. The locked portion of the memory is then seeded with a signature. Upon detecting the system crash, the method dumps the seeded portion of the memory, including an image of the seeded signature, to the dump disk. The memory image is then verified by comparing the image of the seeded signature with the signature that was seeded in the locked portion of the memory prior to the system crash.

In a further aspect, the present invention is directed to a method of verifying a dumped memory image following a crash of a computer system. The computer system includes physical memory, a system kernel, and a virtual memory system. The method includes locking at least a portion of the system memory, for example one page of the memory, by pre-allocating the page to the system kernel during initialization of the computer system. The pre-allocated page is then withheld from the virtual memory system so that the page is not classified as swappable memory. The locked page of the memory is then seeded with a signature. Upon detecting the system crash, the seeded page of the memory, including an image of the seeded signature, is dumped to the dump disk. The content and the location of the memory image are then verified by comparing the image of the seeded signature with the signature that was seeded in the locked page of the memory prior to the system crash.

In yet a further aspect, the present invention is directed to a memory image verification system operable with a computing platform. The system includes a system memory comprising a plurality of memory portions. At least one of the memory portions is operable to be seeded with a predetermined signature. A memory swap structure associated with the system memory operates to temporarily store a selected memory portion on a swap partition when the selected portion is not being actively used by an application running on the computing platform. In order to ensure that a seeded memory portion is not swapped to the swap partition, the system also includes a locking mechanism for preventing the seeded memory portion from being swapped by the memory swap structure. Finally, the system includes a dump storage device for storing a dump file containing the seeded memory portion when the computing platform crashes due to a fatal error.

The locking mechanism may include a system kernel, a virtual memory system, and a low level program that supports an Application Programming Interface (API) to pre-allocate the seeded memory portion to the system kernel during initialization of the computing platform, thereby preventing the seeded memory portion from being allocated to the virtual memory system as swappable memory.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

In the drawings, like or similar elements are designated with identical reference numerals throughout the several views thereof, and the various elements depicted are not necessarily drawn to scale. The present invention is a system and method that reliably provides a "before" image of the data stored in system RAM at the time of a system crash, and compares the "before" image to an "after" image of the data that is dumped to the dump disk. In this manner, the crash dump path code can be tested for its reliability and accuracy.

The present invention seeds a pattern (signature) in the physical memory and makes sure that the signature stays in the memory until a crash occurs. The method then examines the image written out by the crash dump path code to verify that the signature is reflected in the data written out to the dump disk during the crash dump. The signature can be an ASCII set or any other suitable signature method. The dump disk may be a local disk or, for some operating systems, a network disk.

The signature is preferably seeded in at least one pre-defined physical page of the RAM, and the seeded page(s) are preferably locked during the system boot procedure. The signature can be stored using application memory to store the signature. Alternatively, another kernel module can be used to store the signature. For testing purposes, a fatal error is then instigated.

The amount of memory that is seeded and locked depends upon the particular test being run. During testing, the developers test the crash dump path code with different test cases. In some cases, a large portion of memory is seeded and locked to ensure that it gets dumped properly. In other cases, specific smaller portions of the memory are seeded and locked to ensure that they are included in the dump.

In one configuration, the seeding is partition-specific seeding. In a multi-processor architecture, the RAM may be partitioned for different processors. There is one instance of the OS running on each partition, and the seeding is performed relative to the multiple instances of the OS. Thus, a particular partition can be specified to be imaged and verified.

Figure 1:
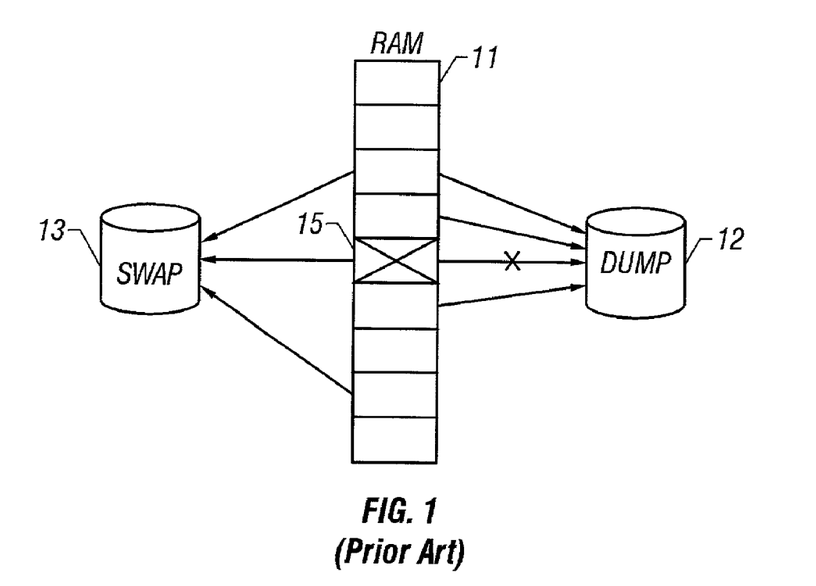
FIG. 1 (Prior Art) is an exemplary memory architecture illustrating selected portions of RAM in an existing computer system which are written to a space on disk reserved for dump while also being swapped out during the execution of a resource-intensive program.

Referring now to FIG. 1, depicted therein is an exemplary memory architecture illustrating selected portions of RAM 11 in an existing computer system which are written to a space on disk 12 reserved for dump while also being swapped out to a swap partition 13 during the execution of a resource-intensive program. As noted above, if a portion of the RAM, such as portion 15, is not being actively utilized, it is swapped out of the RAM and stashed on the swap partition until it is needed. When the RAM portion is needed again, it is swapped back in. This swapping procedure is particularly active when running resource-intensive programs. If RAM portion 15 is swapped out when a system crash occurs, that portion of the RAM is not included in the dump. If part of a signature pattern was seeded in the RAM portion 15, an incomplete signature may be dumped.

Figure 2:
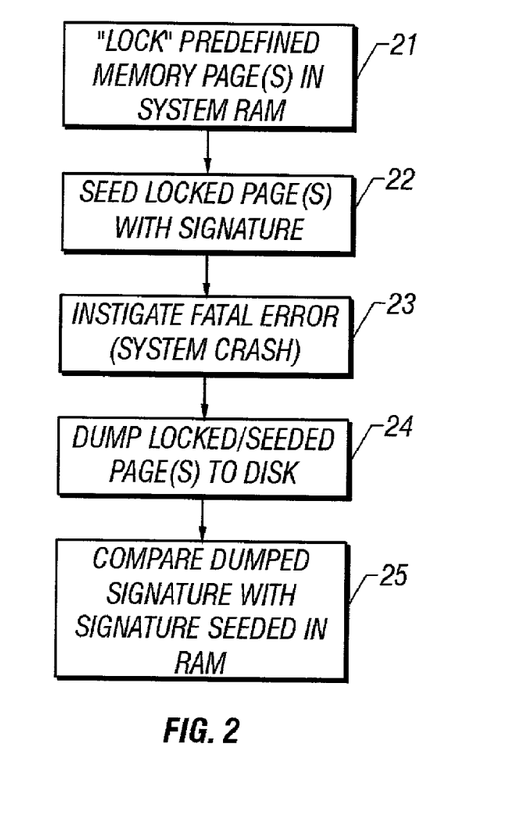
FIG. 2 is a flow chart illustrating the overall steps of an exemplary configuration of the method of the present invention.
Figure 3:
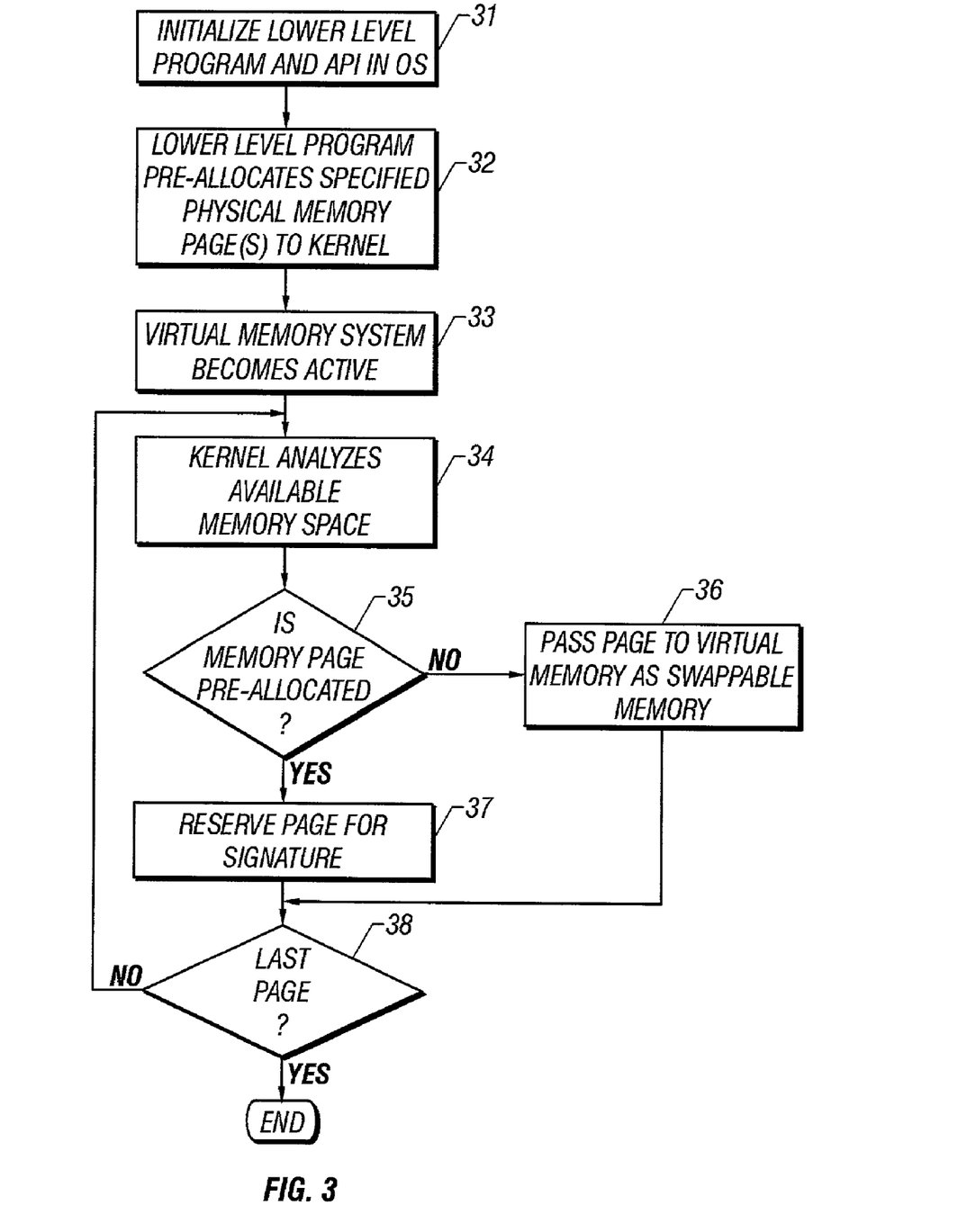
FIG. 3 is a flow chart illustrating the steps of a preferred method of locking a page in RAM.
Figure 4:
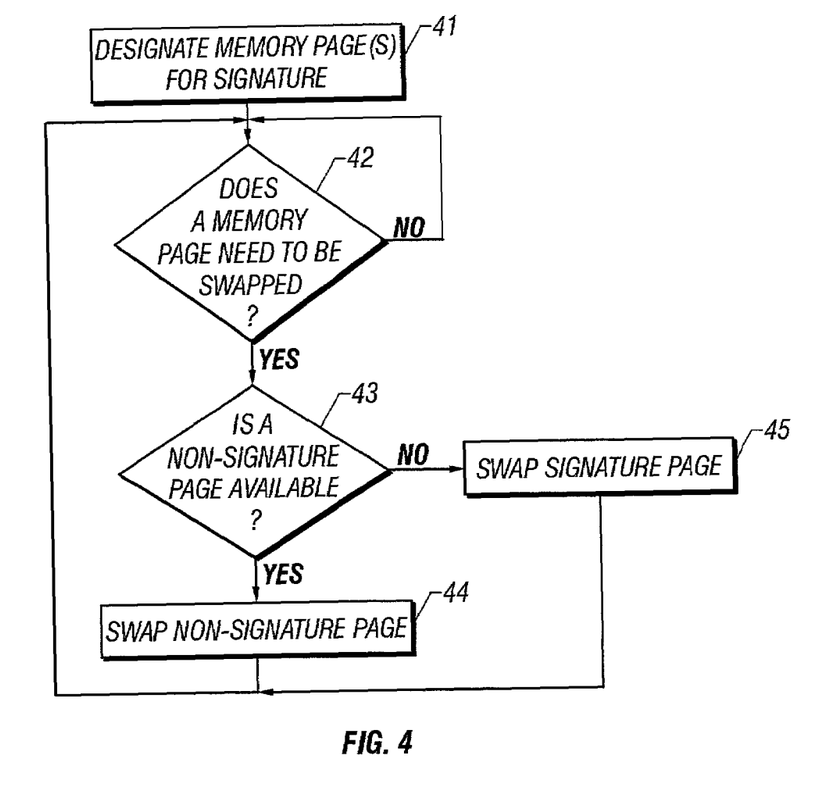
FIG. 4 is a flow chart illustrating the steps of an alternative method of locking a page in RAM.

FIG. 2 is a flow chart illustrating the overall steps of an exemplary configuration of the method of the present invention. At step 21, a portion of the system RAM, such as one or more predefined memory pages, is locked, thus preventing the memory portion from being swapped to disk when a resource-intensive program is run. Alternative methods of locking the memory page(s) are shown in FIGS. 3 and 4 below. At step 22, the locked page(s) are seeded with a signature thread or pattern. At step 23, a fatal error is instigated, causing a system crash. At step 24, the crash dump path code dumps the locked/seeded page(s) to disk. At step 25, the dumped signature is compared to the signature that was originally seeded in the RAM to verify the accuracy of the crash dump process.

FIG. 3 is a flow chart illustrating the steps of the preferred method of locking a page in RAM. An important feature of the invention is that it locks the seeded memory portions so that they are not swapped out, thus preventing the signature pattern from being destroyed. An alternative approach is to disable all memory swapping during the test. However, this makes it difficult to verify that the crash dump path code could operate properly in an intensive Input/Output (I/O) situation in which swapping is needed. The preferred approach enables the system to be heavily loaded during the test.

In an exemplary embodiment, a low level program having an Application Programming Interface (API) is initialized in the Operating System (OS) at step 31. At step 32, the program uses the API to pre-allocate one or more specified physical pages of memory used to store the signature. The page is pre-allocated at an early stage of the system boot (initialization) procedure. While the system kernel is determining what hardware is present and how much memory is available, specified pages may be reserved, for example, at the beginning, middle, and end of the memory, and the reserved pages are saved for signatures. The kernel memory allocation routine is used before the virtual memory system becomes active at step 33. At step 34, the system kernel analyzes the available memory space. As it analyzes each page of memory at step 35, it determines whether the memory page is pre-allocated. If not, the process moves to step 36 where the page location is passed to the virtual memory system as swappable memory. If, however, the page is pre-allocated, the page is not passed to virtual memory, but is reserved for the signature pattern at step 37. At step 38 it is determined whether the analyzed page is the last page in memory. If not, the process returns to step 34 where the kernel analyzes the next page. When the last page is analyzed, the process ends. Thus, the pre-allocated memory pages are identified as being part of the kernel, and are not passed to the virtual memory system as swappable memory. Since it is not passed to the virtual memory system, it does not become a candidate for being swapped, and is thus "locked".

FIG. 4 is a flow chart illustrating the steps of an alternative embodiment of a method of "locking" a page in RAM. In this method, a program is run which causes the operating system to put the seeded memory low on its priority list for swapping. At step 41 one or more memory pages are designated and seeded as signature pages. At step 42, the system determines, while running a resource-intensive program, whether a memory page needs to be swapped to the swap partition 13. If not, the system continues to monitor memory utilization at step 42. If it is determined that a memory page needs to be swapped, the process moves to step 43 where it is determined whether a non-signature page is available (i.e., whether a page that is not seeded with the signature is not being utilized). If so, the non-signature page is swapped at step 44. However, if a non-signature page is not available, then the process may move to step 45 where a signature page is swapped. When utilizing this method, it is likely that the signature will still be in memory when the crash dump occurs, but it is not guaranteed. The higher the load on the system, the more likely it becomes that a signature page will be swapped out when the crash dump occurs.

An application level program and API may alternatively be utilized to lock a page of memory, but this approach is not preferred since it does not provide control over the actual physical memory location. In this embodiment, the seeded memory is locked by specifying the virtual address of the seeded portion. The application level program instructs the OS to lock a specified virtual page of memory. The OS pins that virtual page to a physical page of its choice. At the application level, the location of the physical page is not known.

For crash dump verification, however, it is desirable to use a more specialized procedure. The crash dump verification is more reliable if the testers have control over the physical page. When the physical page is known, the corner cases for crash dumping such as the first page, the last page, and so on can be verified. If there is no control over the physical page, the testers only know that the page was dumped; the other data indicating accuracy of the dump are not available.

Figure 5:
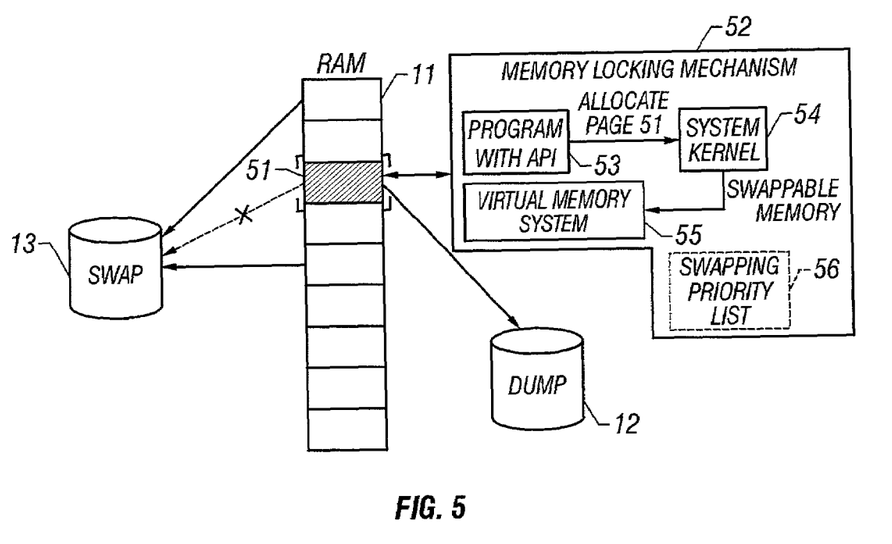
FIG. 5 is an exemplary memory system depicting a seeded and locked portion of the RAM being dumped in accordance with the teachings of the present invention at the time of a system crash.

FIG. 5 is an exemplary memory system depicting a seeded and locked portion 51 of the RAM 11 being dumped to the dump disk 12 at the time of a system crash in accordance with the teachings of the present invention. The seeded RAM portion 51 has been locked with a memory locking mechanism 52, thereby preventing it from being swapped out to swap space 13 on the disk prior to the crash. It should be appreciated that the locking mechanism 52 may be implemented in accordance with any of the locking methodologies described above. Thus, the signature is guaranteed to be in memory when the crash dump is activated. When the crash dump is performed, the image that is saved to disk can be analyzed to verify that the signature is present, and that it is accurate. This indicates that the dump was successful.

In an exemplary embodiment, the memory locking mechanism 52 includes a lower level program and API 53 which is initialized in the OS. The program uses the API to pre-allocate one or more specified physical pages of memory (for example, page 51) used to store the signature. The page is pre-allocated to the system kernel 54 at an early stage of the system boot (initialization) procedure before the Virtual Memory System 55 becomes active. If a page such as page 51 is pre-allocated, the page is not passed to the Virtual Memory System as swappable memory, but is reserved for the signature pattern. Since the page is not passed to the virtual memory system, it does not become a candidate for being swapped, and is thus "locked".

In the alternative embodiment described in FIG. 4, the memory locking mechanism 52 includes a swapping priority list 56. The locking mechanism assigns the seeded memory a low priority on the swapping priority list. When a memory page needs to be swapped to the swap partition 13, the system first determines whether a non-signature page is available, and if so, the non-signature page is swapped. Only if there are no non-signature pages available is a seeded page swapped out. Thus, although not guaranteed, it likely that the seeded memory will not be swapped out when a crash dump occurs.

The invention thus provides a system and method that reliably provides a "before" image of the data stored in system RAM at the time of a system crash, and compares the "before" image to an "after" image of the data that is dumped to disk at the time of the crash. In this manner, the crash dump path code can be tested for its reliability and accuracy. The invention is applicable to different types of computer systems, and is applicable to any OS that saves the memory image following a fatal error.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while specific implementation examples have been described in reference to the presently preferred exemplary embodiment of the present invention, such implementations are merely illustrative. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method of verifying a memory image written from system memory to a dump disk when a computer system experiences a fatal error causing a system crash, said method comprising:

locking at least one portion of the system memory to prevent the locked portion from being swapped out to a swap partition prior to the system crash;

seeding the locked portion of the memory with a signature;

upon detecting the system crash, dumping the seeded portion of the memory to the dump disk, said dumped portion including an image of the seeded signature; and verifying the memory image by comparing the dumped signature image with the signature that was seeded in the locked portion of the memory prior to the system crash.

2. The method of verifying a memory image of claim 1 wherein the computer system includes a system kernel and a virtual memory system, and the step of locking at least one portion of the system memory includes:

pre-allocating specified portions of the system memory to the system kernel during initialization of the computer system; and withholding the pre-allocated portions of the memory from the virtual memory system so that the pre-allocated portions are not classified as swappable memory.

3. The method of verifying a memory image of claim 2 wherein the step of pre-allocating specified portions of the system memory includes pre-allocating by a lower level program having an Application Programming Interface (API), at least one physical memory page to the system kernel.

4. The method of verifying a memory image of claim 1 wherein the system memory includes a beginning, a middle, and an end, and the step of locking at least one portion of the system memory includes locking a plurality of physical pages, said physical pages including at least one physical page at the beginning of system memory, the middle of system memory and the end of system memory.

5. The method of verifying a memory image of claim 1 wherein the computer system includes an Operating System (OS) that controls memory swapping using a priority list, and the step of locking at least one portion of the system memory includes:
   designating at least one portion of memory to be seeded with the signature; and
   instructing the OS to put the seeded memory low on the priority list for swapping.

6. The method of verifying a memory image of claim 5 wherein the step of locking at least one portion of the system memory also includes:
   determining by the OS, whether a portion of memory needs to be swapped out;
   upon determining that a portion of memory needs to be swapped out, determining by the OS whether a non-signature portion of memory is available for swapping out; and
   upon determining that a non-signature portion of memory is available, swapping out the available non-signature portion of memory.

7. The method of verifying a memory image of claim 1 wherein the step of locking at least one portion of the system memory includes utilizing an application level program having an Application Programming Interface (API) to lock at least one portion of system memory.

8. The method of verifying a memory image of claim 1 wherein the step of seeding the locked portion of the memory with a signature includes seeding the locked portion of the memory with an ASCII set.

9. The method of verifying a memory image of claim 1 wherein the step of verifying the memory image includes verifying the content and the location of the memory image.

10. A method of verifying a memory image written from system memory to a dump disk when a computer system experiences a fatal error causing a system crash, said computer system including physical memory, a system kernel, and a virtual memory system, said method comprising:
   locking at least one page of the system memory by pre-allocating it during initialization of the computer system, and withholding the pre-allocated page from the virtual memory system so that the pre-allocated page is not classified as swappable memory;
   seeding the locked page of the memory with a signature;
   upon detecting the system crash, dumping the seeded page of the memory to the dump disk, said dumped page including an image of the seeded signature; and
   verifying the content and the location of the memory image by comparing the image of the seeded signature with the signature that was seeded in the locked page of the memory prior to the system crash.

11. A memory image verification system operable with a computing platform, said system comprising:
   a system memory comprising a plurality of memory portions, at least one of said memory portions operable to be seeded with a predetermined signature;
   a memory swap structure associated with the system memory, said structure operating to temporarily store a selected memory portion on a swap partition when the selected portion is not in use by an application running on the computing platform;
   a locking mechanism for preventing the seeded memory portion from being swapped by the memory swap structure; and
   a dump storage device for storing a dump file created when the computing platform crashes due to a fatal error, the dump file containing the seeded memory portion.

12. The memory image verification system of claim 11 wherein the locking mechanism includes:
   a system kernel that initializes the computing platform and allocates swappable memory portions;
   a virtual memory system that receives the swappable memory portions from the system kernel and directs the memory swap structure to swap only the swappable memory portions; and
   a program that pre-allocates the seeded memory portion to the system kernel during initialization of the computing platform, thereby preventing the seeded memory portion from being allocated as swappable memory.

13. The memory image verification system of claim 12 wherein the program is a lower level program that utilizes an Application Programming Interface (API) to pre-allocate at least one physical page of memory to the system kernel.

14. The memory image verification system of claim 13 wherein a plurality of memory portions are seeded with the predetermined signature, and the lower level program pre-allocates a plurality of physical pages of memory to the system kernel.

15. The memory image verification system of claim 11 wherein the system memory includes a beginning, a middle, and an end, and the locking mechanism is operable to lock a plurality of physical pages, said physical pages including at least one physical page at the beginning of system memory, the middle of system memory and the end of system memory.

16. The memory image verification system of claim 11 wherein the memory swap structure includes a priority list of swappable memory portions, said list including seeded and non-seeded memory portions.

17. The memory image verification system of claim 16 wherein the locking mechanism includes means for placing the seeded memory portions low on the priority list of swappable memory portions.

18. The memory image verification system of claim 17 wherein the means for placing the seeded memory portions low on the priority list of swappable memory portions includes means for directing the memory swap structure to swap a non-seeded portion when a memory portion needs to be swapped, and a non-seeded portion is available for swapping.

19. A method of verifying a memory image written from system memory to a dump disk when a computer system experiences a fatal error causing a system crash, said method comprising:
   locking at least one portion of the system memory to prevent the locked portion from being swapped out to a swap partition prior to the system crash, the system memory including a beginning, a middle, and an end, wherein the locking of at least one portion of the system memory comprises locking at least one of a physical page of memory at the beginning of the system memory, the middle of the system memory, and the end of the system memory;

seeding the locked portion of the memory with a signature;

upon detecting the system crash, dumping the seeded portion of the memory to the dump disk, said dumped portion including an image of the seeded signature; and verifying the memory image by comparing the dumped signature image with the signature that was seeded in the locked portion of the memory prior to the system crash.

20. The method of verifying a memory image of claim 19 wherein the locking of at least one portion of the system memory includes utilizing an application level program having an Application Programming Inter ace (API) to lock at least one portion of system memory.

21. The method of verifying a memory image of claim 19 wherein the seeding of the locked portion of the memory with a signature includes seeding the locked portion of the memory with an ASCII set.

22. The method of verifying a memory image of claim 19 wherein the verifying of the memory image includes verifying the content and the location of the memory image.

23. A memory image verification system operable with a computing platform, said system comprising:

a system memory comprising a plurality of memory portions, including a beginning portion, a middle portion, and an end portion of the system memory, at least one of said memory portions operable to be seeded with a predetermined signature;

a memory swap structure associated with the system memory, said structure operating to temporarily store a selected memory portion on a swap partition when the selected portion is not in use by an application running on the computing platform;

a locking mechanism for preventing the seeded memory portion from being swapped by the memory swap structure, wherein the locking mechanism is operable to lock at least one of a physical page at the beginning portion of the system memory, the middle portion of the system memory, and the end portion of the system memory; and a dump storage device for storing a dump file created when the computing platform crashes due to a fatal error, the dump file containing the seeded memory portion.

24. The memory image verification system of claim 23 wherein the locking mechanism includes:

a system kernel that initializes the computing platform and allocates swappable memory portions;

a virtual memory system that receives the swappable memory portions from the system kernel and directs the memory swap structure to swap only the swappable memory portions; and a program that pre-allocates the seeded memory portion to the system kernel during initialization of the computing platform, thereby preventing the seeded memory portion from being allocated as swappable memory.

25. The memory image verification system of claim 23 wherein the memory swap structure includes a priority list of swappable memory portions, said list including seeded and non-seeded memory portions.

26. The memory image verification system of claim 25 wherein the locking mechanism includes means for placing the seeded memory portions low on the priority list of swappable memory portions.

* * * * *

UNITED STATES PATENT AND TRADEMARK OFFICE
CERTIFICATE OF CORRECTION

| | | |
|---|---|---|
| PATENT NO. | : 7,178,068 B2 | Page 1 of 4 |
| APPLICATION NO. | : 10/113083 | |
| DATED | : February 13, 2007 | |
| INVENTOR(S) | : David L. Maison et al. | |

It is certified that error appears in the above-identified patent and that said Letters Patent is hereby corrected as shown below:

In columns 6, 7 and 8, and lines 39-67, 1-67, and 1-57 respectively,
delete "1. A method of verifying a memory image written from system memory to a dump disk when a computer system experiences a fatal error causing a system crash, said method comprising: locking at least one portion of the system memory to prevent the locked portion from being swapped out to a swap partition prior to the system crash; seeding the locked portion of the memory with a signature; upon detecting the system crash, dumping the seeded portion of the memory to the dump disk, said dumped portion including an image of the seeded signature; and verifying the memory image by comparing the dumped signature image with the signature that was seeded in the locked portion of the memory prior to the system crash.

2. The method of verifying a memory image of claim 1 wherein the computer system includes a system kernel and a virtual memory system, and the step of locking at least one portion of the system memory includes: pre-allocating specified portions of the system memory to the system kernel during initialization of the computer system; and withholding the pre-allocated portions of the memory from the virtual memory system so that the pre-allocated portions are not classified as swappable memory.

3. The method of verifying a memory image of claim 2 wherein the step of pre-allocating specified portions of the system memory includes pre-allocating by a lower level program having an Application Programming Interface (API), at least one physical memory page to the system kernel.

4. The method of verifying a memory image of claim 1 wherein the system memory includes a beginning, a middle, and an end, and the step of locking at least one portion of the system memory includes locking a plurality of physical pages, said physical pages including at least one physical page at the beginning of system memory, the middle of system memory and the end of system memory.

5. The method of verifying a memory image of claim 1 wherein the computer system includes an Operating System (OS) that controls memory swapping using a priority list, and the step of locking at least one portion of the system memory includes: designating at least one portion of memory to be seeded with the signature; and instructing the OS to put the seeded memory low on the priority list for swapping.

UNITED STATES PATENT AND TRADEMARK OFFICE
CERTIFICATE OF CORRECTION

| | |
|---|---|
| PATENT NO. | : 7,178,068 B2 |
| APPLICATION NO. | : 10/113083 |
| DATED | : February 13, 2007 |
| INVENTOR(S) | : David L. Maison et al. |

It is certified that error appears in the above-identified patent and that said Letters Patent is hereby corrected as shown below:

6. The method of verifying a memory image of claim 5 wherein the step of locking at least one portion of the system memory also includes: determining by the OS, whether a portion of memory needs to be swapped out; upon determining that a portion of memory needs to be swapped out, determining by the OS whether a non-signature portion of memory is available for swapping out; and upon determining that a non-signature portion of memory is available, swapping out the available non-signature portion of memory.

7. The method of verifying a memory image of claim 1 wherein the step of locking at least one portion of the system memory includes utilizing an application level program having an Application Programming Interface (API) to lock at least one portion of system memory.

8. The method of verifying a memory image of claim 1 wherein the step of seeding the locked portion of the memory with a signature includes seeding the locked portion of the memory with an ASCII set.

9. The method of verifying a memory image of claim 1 wherein the step of verifying the memory image includes verifying the content and the location of the memory image.

10. A method of verifying a memory image written from system memory to a dump disk when a computer system experiences a fatal error causing a system crash, said computer system including physical memory, a system kernel, and a virtual memory system, said method comprising: locking at least one page of the system memory by pre-allocating it during initialization of the computer system, and withholding the pre-allocated page from the virtual memory system so that the pre-allocated page is not classified as swappable memory; seeding the locked page of the memory with a signature; upon detecting the system crash, dumping the seeded page of the memory to the dump disk, said dumped page including an image of the seeded signature; and verifying the content and the location of the memory image by comparing the image of the seeded signature with the signature that was seeded in the locked page of the memory prior to the system crash.

UNITED STATES PATENT AND TRADEMARK OFFICE
CERTIFICATE OF CORRECTION

| | | |
|---|---|---|
| PATENT NO. | : 7,178,068 B2 | |
| APPLICATION NO. | : 10/113083 | |
| DATED | : February 13, 2007 | |
| INVENTOR(S) | : David L. Maison et al. | |

It is certified that error appears in the above-identified patent and that said Letters Patent is hereby corrected as shown below:

11. A memory image verification system operable with a computing platform, said system comprising: a system memory comprising a plurality of memory portions, at least one of said memory portions operable to be seeded with a predetermined signature; a memory swap structure associated with the system memory, said structure operating to temporarily store a selected memory portion on a swap partition when the selected portion is not in use by an application running on the computing platform; a locking mechanism for preventing the seeded memory portion from being swapped by the memory swap structure; and a dump storage device for storing a dump file created when the computing platform crashes due to a fatal error, the dump file containing the seeded memory portion.

12. The memory image verification system of claim 11 wherein the locking mechanism includes: a system kernel that initializes the computing platform and allocates swappable memory portions; a virtual memory system that receives the swappable memory portions from the system kernel and directs the memory swap structure to swap only the swappable memory portions; and a program that pre-allocates the seeded memory portion to the system kernel during initialization of the computing platform, thereby preventing the seeded memory portion from being allocated as swappable memory.

13. The memory image verification system of claim 12 wherein the program is a lower level program that utilizes an Application Programming Interface (API) to pre-allocate at least one physical page of memory to the system kernel.

14. The memory image verification system of claim 13 wherein a plurality of memory portions are seeded with the predetermined signature, and the lower level program pre-allocates a plurality of physical pages of memory to the system kernel.

15. The memory image verification system of claim 11 wherein the system memory includes a beginning, a middle, and an end, and the locking mechanism is operable to lock a plurality of physical pages, said physical pages including at least one physical page at the beginning of system memory, the middle of system memory and the end of system memory.

UNITED STATES PATENT AND TRADEMARK OFFICE
CERTIFICATE OF CORRECTION

PATENT NO. : 7,178,068 B2
APPLICATION NO. : 10/113083
DATED : February 13, 2007
INVENTOR(S) : David L. Maison et al.

It is certified that error appears in the above-identified patent and that said Letters Patent is hereby corrected as shown below:

16. The memory image verification system of claim 11 wherein the memory swap structure includes a priority list of swappable memory portions, said list including seeded and non-seeded memory portions.

17. The memory image verification system of claim 16 wherein the locking mechanism includes means for placing the seeded memory portions low on the priority list of swappable memory portions.

18. The memory image verification system of claim 17 wherein the means for placing the seeded memory portions low on the priority list of swappable memory portions includes means for directing the memory swap structure to swap a non-seeded portion when a memory portion needs to be swapped, and a non-seeded portion is available for swapping.".

In column 9, line 16, in Claim 20, delete "Inter ace" insert -- Interface --, therefor.

Signed and Sealed this

Sixteenth Day of June, 2009

JOHN DOLL
*Acting Director of the United States Patent and Trademark Office*